United States Patent [19]

Miller

[11] 4,378,856
[45] Apr. 5, 1983

[54] PASSAGEWAY FOR TRUCK CAB AND SLEEPER UNIT

[75] Inventor: Ray S. Miller, Shipshewana, Ind.

[73] Assignee: Double Eagle Industries, Inc., Shipshewana, Ind.

[21] Appl. No.: 237,627

[22] Filed: Feb. 24, 1981

[51] Int. Cl.³ .............................................. B62D 23/00
[52] U.S. Cl. ............................... 180/89.14; 180/89.16; 296/166; 296/190
[58] Field of Search ............... 180/89.12, 89.13, 89.14, 180/89.15, 89.16, 89.19; 296/166, 190

[56] References Cited

U.S. PATENT DOCUMENTS

| | | | |
|---|---|---|---|
| 3,586,119 | 6/1971 | Chuchua | 180/14 |
| 3,625,560 | 12/1971 | Bjork | 296/166 |
| 3,638,991 | 2/1972 | Hathaway | 296/166 |
| 3,900,224 | 8/1975 | Copeland | 296/166 |
| 4,093,301 | 6/1978 | Kwok | 296/166 |
| 4,121,684 | 10/1978 | Stephens et al. | 180/89.14 |
| 4,222,451 | 9/1980 | Lamb | 296/190 |
| 4,222,605 | 9/1980 | Engelhard | 296/166 |
| 4,257,645 | 3/1981 | Balogh | 296/166 |
| 4,294,485 | 10/1981 | Engelhard | 296/166 |

Primary Examiner—Joseph F. Peters, Jr.
Assistant Examiner—John A. Carroll
Attorney, Agent, or Firm—Barnes & Thornburg

[57] ABSTRACT

An arrangement including a passageway connection of the type for use in interconnecting the interior of a vehicle driver's cab and the interior of a sleeper unit mounted behind the cab comprising an outer accordian seal and an inner boot member. The outer accordian seal is mounted surrounding an external side of openings in the front and rear walls respectively, of a sleeper unit and driver's cab so as to provide a detachable water tight seal, while the inner boot member provides sound and temperature insulation as well as an attractive smooth appearance, and also coacting with a detachable end of the outer accordian seal so as to retain same in its assembled condition. The outer accordian seal also acts to protect the inner boot member which might otherwise be destroyed by exposure to the environment, truck washing equipment, and the like. When the arrangement includes a sleeper unit mounted behind a driver's cab of the "cab-over" type the passageway connection construction finds particular utility with regard to problems occurring in such an environment due to relative movements between the driver's cab and sleeper unit.

7 Claims, 4 Drawing Figures

PASSAGEWAY FOR TRUCK CAB AND SLEEPER UNIT

BACKGROUND OF THE INVENTION

1. Field of the Invention

The present invention relates to arrangements effectuating a passageway connection between the driver's cab of a vehicle and a sleeper unit located therebehind. More particularly, the present invention is related to such arrangements in so-called "cab-over" truck tractors of the type used in conjunction with a towable trailer rig for hauling freight, a sleeper unit being mounted to the trailer frame behind the driver's cab.

2. Description of the Prior Art

In the environment of pickup truck mounted camper units of the type wherein a camper body (including a sleeping compartment) is mounted so as to rest on the bed of the truck and having a pan-handle portion which overlies the roof of the driver's cab, it is known to provide a passageway connection between the driver's cab and the body of the camper. For the purpose of preventing dust or water from entering the driver's cab or camper as well as to prevent the loss of heating or air conditioning, it has been known to provide a boot in the form of a sleeve of a flexible material, which may or may not include an insulation material, for forming a passageway connection between an opening in a rear wall of the driver's cab and an opening in an oppositely facing wall of the camper unit. Examples of such arrangements can be found in U.S. Pat. Nos. 4,093,301; 3,900,224; 3,638,991; and 3,586,119.

It has also been known to provide sleeper units on truck tractors of the type used with a tractor-trailor rig for long distance hauling of freight More particularly, it has been known to permanently and rigidly install a sleeper unit to the frame of such trucks behind the driver's cab and to provide a walk through opening directly between the rear of the driver's cab and the front of the sleeper unit, again a boot of flexible material being utilized to interconnect the camper opening with the driver's cab opening. Such units have been manufactured, for example, by Double Eagle Industries, Inc., Shipshewana, Ind. for conventional hood engine access trucks.

In recent years, the so-called "cab-over" truck design has come into preeminence. In such trucks, the engine is mounted beneath the driver's cab and access thereto is not via an access opening, but rather is by an upward swinging of the driver's cab so as to provide access to the engine therebelow. In such units some rocking of the driver's cab relative to the frame of the tractor unit occurs during driving under normal road conditions. On the other hand, in equipping such a tractor with an independent sleeper unit, the sleeper unit is rigidly fixed to the tractor frame behind the driver's cab with sufficient clearance to enable upward swinging of the driver's cab. As a result, if a passageway connection is to be provided between the sleeper unit and the driver's cab, it must be easily and quickly detachable from the driver's cab to enable movement thereof and it must also be able to withstand the usual stresses which will occur due to relative movements between the independently mounted driver's cab and sleeper unit without becoming detached or becoming damaged. Still further, truckers take great pride in their units and therefore frequently wash same in specially designed truck car washing units designed for this purpose. Such washing units apply water at very high pressures (over 700 psi) to the truck and thus any passageway connection that is provided must be able to effectively seal out the water in a positive manner under such pressures, especially since the passageway connection is exposed at top and both sides in the noted space that must be left between the driver's cab and sleeper unit.

SUMMARY AND OBJECTS OF THE INVENTION

It is an object of the present invention to provide an arrangement including a passageway connection for interconnecting the interior of a vehicle driver's cab and the interior of a sleeper unit mounted behind the cab which will provide a secure positive sealing despite repeated and considerable relative movements between the drivers cab and the sleeper unit and despite exposure to high pressure water streams in truck washes and the like.

It is a further object of the present invention to provide a passageway connection which is easily and quickly attached and detached from a driver's cab.

Yet another object of the present invention is to provide a passageway connection that is particularly suitable for use with cab-over type trucks and particularly for providing a walk-through type access opening between the driver's cab and the sleeper unit.

Still another object of the present invention is to provide a passageway connection arrangement capable of achieving all of the above noted objects, while providing an attractive interior finish appearance.

These objects are achieved in accordance with a preferred embodiment of the present invention by a passageway connection comprising an outer accordian seal that is mountable perimetrically continuously surrounding an external side of the opening through facing walls of the sleeper unit and the driver's cab, at least one of the mountings being by way of an easily demountable fastening means; and an inner boot member that is mountable about an inner side of the openings at respective opposite ends thereof in a manner extending from the inner side of the opening in a wall of the sleeper unit, through the outer accordian seal and through the opening in the facing wall of the driver's cab to the inner side of the driver's cab rear wall, the mounting of at least one of the ends of the inner boot member also being by an easily demountable fastening means.

The outer accordian seal provides a water tight sealing of the passageway connection despite appreciable relative movements between the sleeper unit and driver's cab, while the inner boot member not only provides insulation and an attractive, easily maintainable interior finish appearance, but also serves the function of retaining the seal attached at its demountable fastening.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
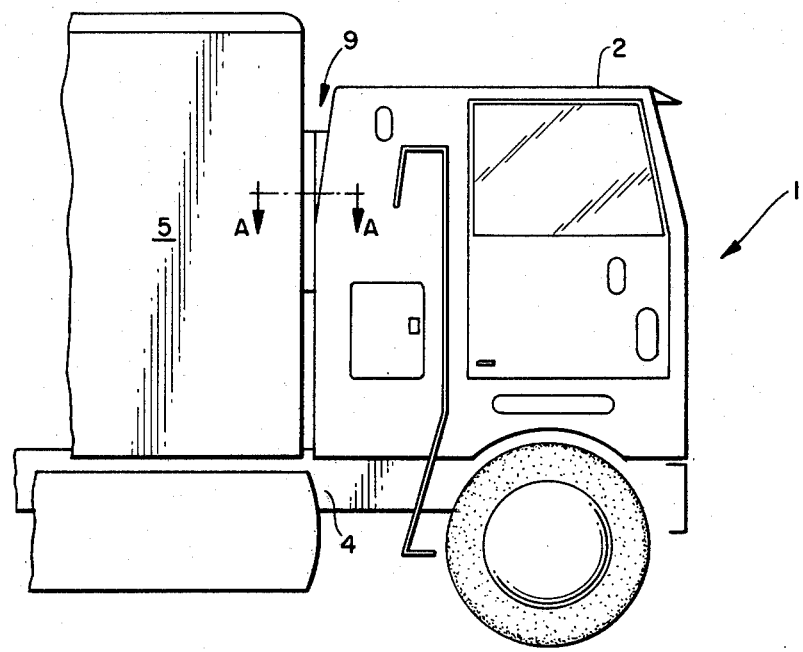
FIG. 1 is a partial side elevational view of a cab-over tractor equipped with the arrangement according to the present invention.
Figure 2:
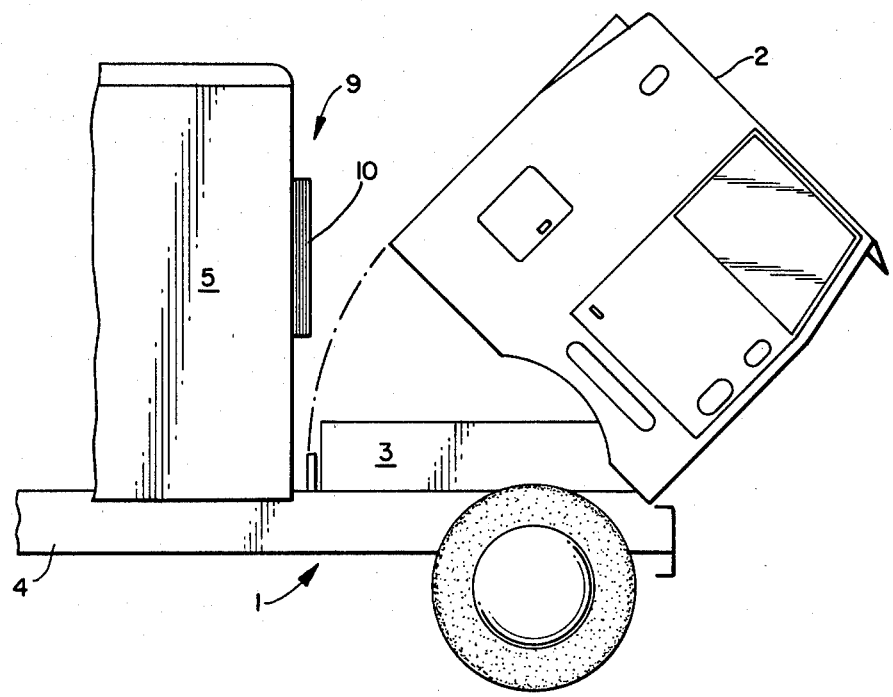
FIG. 2 is a view similar to FIG. 1 but showing the driver's cab in its engine access position and with the passageway connection between the sleeper and driver's cab disconnected.

FIGS. 1 and 2 illustrate a truck tractor of the type used for long distance hauling of large quantities of freight in a trailer unit that may be attached to the rear end thereof by a conventional king pin connection (not shown). The tractor unit has a driver's cab of the "cab-over" type that, as can be seen from FIG. 2, is upwardly swingable so as to provide access to the engine 3 located therebelow. Such tractor cabs and the manner of mounting same to the tractor frame 4 are well known and does not itself form part of the present invention.

Mounted behind the driver's cab 2 is shown a sleeper unit 5 that is rigidly bolted to the frame 4. Such sleeper units per se are also known and are often equipped not only with a matress, but such comfort and convenience items as a heating and air conditioning unit, hot water heater, clock, color TV and stereo system, microwave oven, portable toilet facility, florescent interior lights, independent generator unit, storage areas and the like so as to serve as a home-away-from-home for the long distance trucker.

While the sleeper unit is provided with an exterior door access, provision is also made for direct access between the driver's cab 2 and the sleeper unit 5 via a through passageway connection indicated generally by the reference numeral 9.

Figure 3:
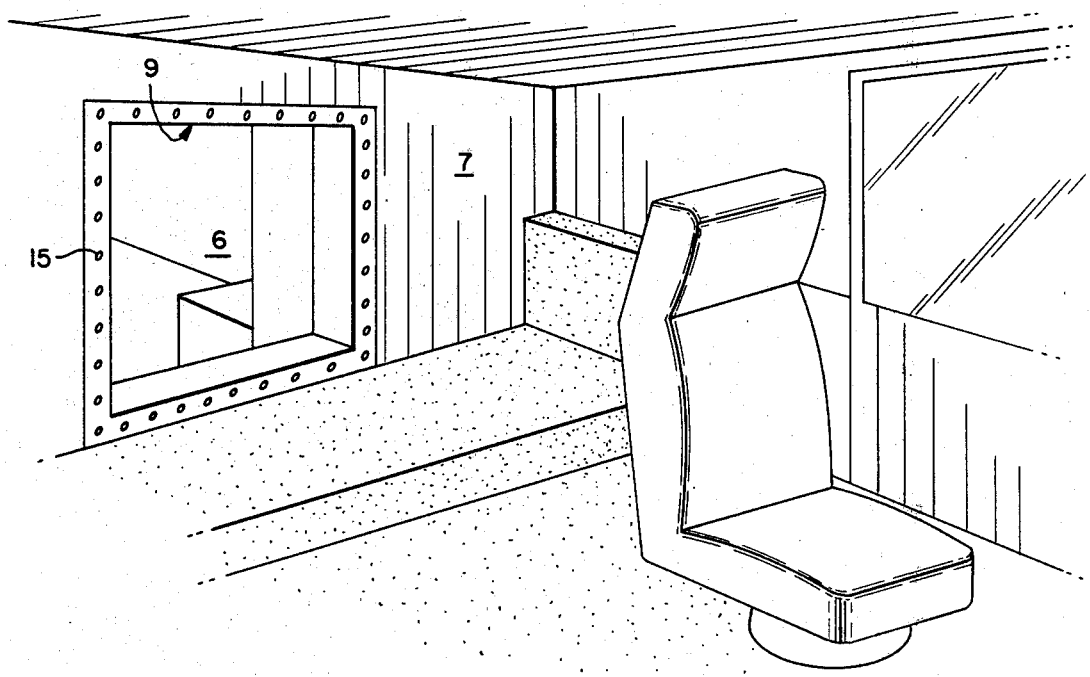
FIG. 3 is a perspective view showing the passageway connection as seen from the interior of a driver's cab looking therethrough into the interior of the sleeper unit.
Figure 4:
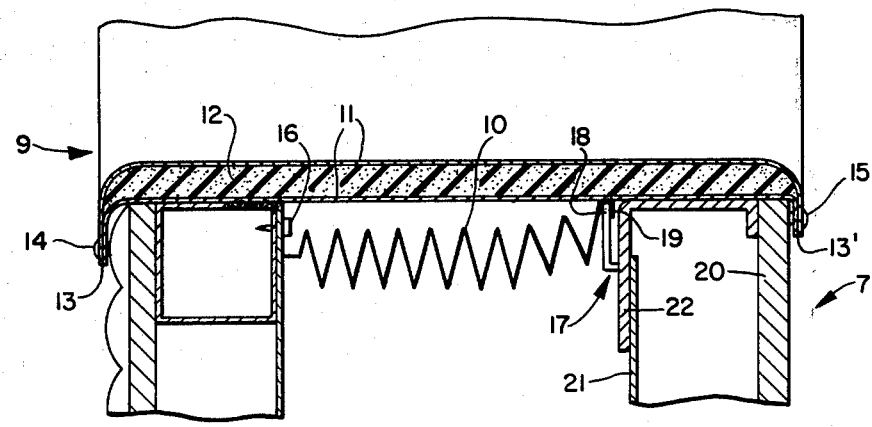
FIG. 4 is a partial sectional view taken along line A—A of FIG. 1.

Turning now to FIG. 4, it can be seen that the passageway connection 9 is comprised of an outer accordian seal 10 which perimetrically continuously surrounds the opening 6 at an external side of the portion thereof formed in the rear cab wall 7 of the driver's cab and the front wall 8 of the sleeper unit 5. Additionally, the passageway connection also comprises an inner boot formed of, for example, two vinyl layers 11, between which is sandwiched a foam padding 12. At one end 13, the boot is fastened to the interior of the sleeper unit wall 8 by screws 14, while at an opposite end 13', the boot is secured to the inner side of wall 7 in an easily detachable manner by snaps 15. As can be seen from FIG. 3, the inner boot extends fully around the opening 6 interiorly of the driver's cab, and a similar situation exists at the interior of the sleeper unit. Additionally, it is noted that in practice, it is often desirable to cover the fixed attachments at the end 13 by a perimetric door frame that also serves for slidably supporting a door closure panel which can be utilized to close off the sleeper unit from the driver's cab.

The outer accordian seal 10 is shown as attached by screw fasteners 16 to the exterior of the front wall 8 of the sleeper unit at locations about and closely adjacent to the perimeter of opening 6 while a detachable mounting arrangement is provided at the driver's cab by an angular frame 17 having a free edge 18 directed toward the inner boot and terminating at a distance and in a configuration corresponding to the approximate equivalent of an imaginary longitudinal extension of the opening in the rear wall 7 of the driver's cab 2 through which the boot passes. The accordian seal 10 is provided with a clip 19 which enables attachment of the accordian seal to the frame shaped angle member 17 in a readily releasable manner. The accordian seal 10 is formed of neoprene rubber that has been molded into the accordian configuration shown and the clip 19 is an integral perimetric formation of U-shaped cross section within which a thin metal reinforcement of likewise U-shaped cross section is incorporated during the molding operation. The walls of the slot formed within the clip 19 are preferable formed with upwardly angled ridges (not shown) which are compressed upon mounting of the clip upon the free end 18 of the perimetric frame 17 of L-shaped cross section.

In view of the fact that the sleeper unit 5 is rigidly bolted to the frame 4, while the cab is not rigidly connected to the frame 4, in driving along roads movements of the cab relative to the sleeper unit occur not only in upward, downward and lateral directions, but also toward and away from the sleeper unit. For example, a three inch spacing between the rear wall of the drivers cab 2 and the front wall of the sleeper unit 5 under static conditions typically will vary by as much as one and one-half to two inches (i.e. reducing the clearance to one and one-half inches or increasing same to four and one-half inches). This behavior creates problems, particularly with respect to being able to maintain a smooth, tight attractive fit of the inner boot during such movements, and preventing the readily detachable clip 19 from inadvertently releasing from the free end 18 of the frame 17 as a result of gyrations of the cab. These problems are solved in accordance with the present invention by the resilient construction of the inner boot and its positional relationship with respect to the free end 18 of the frame 17. More particularly, by providing the foam layer 12 between the skin layers 11, not only is thermal and sound insulation provided, but also the boot is able to retain its smooth, tight appearance, despite relative movements between the cab and sleeper unit toward each other and without damage thereto during relative movements away from each other with respect to their static position. That is, by providing a relatively thick layer of foam 12 between the skin layers 11 and attaching the skin layers together at ends 13, 13' so that the foam layer 12 is partially compressed in the static mounted position illustrated in FIG. 4, any slack in the skins 11 occurring during movements of the walls 7 and 8 towards each other can be taken up by expansion of the foam layer 12 towards its uncompressed size, while elongation of the inner boot can occur during relative movements of the walls 7 and 8 away from each other by further compression of the foam layer.

Furthermore, since the boot is held tight in the position illustrated in FIG. 4 despite relative movements between the walls 7 and 8, by constructing and mounting the frame 17 so that the free edge 18 is positioned adjacent the outer skin 11 of the inner boot in an assembled condition (i.e., so as to lie on the equivalent of an imaginary longitudinal extension of the periphery of the opening in the driver's cab rear wall 7), the presence of the clip 19 upon the free edge 18 will produce a slight localized compression of the outer skin and foam layer and results in the clip 19 being held on the frame 17 by the reaction forces exerted by the inner boot. On the other hand, once snaps 15 are disconnected, the inner boot can be withdrawn from the opening in the rear wall 7 and thereafter, the clip 19 readily dismounted from the frame 17 so that the cab 2 can be swung upwardly.

As can be appreciated from the foregoing, the inner boot serves multiple purposes. It serves an appearance and insulation function and also a seal retaining function. Similarly, the outer seal 10 serves a dual function. It not only provides a high pressure resistant, water tight sealing that is more effective than that achievable by a simple boot member alone, but also serves to protect the inner boot from deterioration and damage to which it would be attendant if it were exposed the elements, and other abusive factors as exist, for example, in truck washing booths.

Since sleeper units of the type to which the present invention is directed are most commonly added on by the vehicle owner and not purchased as original equipment from the truck manufacturer, it is contemplated that the frame 17 be part of a unit that facilitates retrofitting of the rear wall 7 of the driver's cab with a walk-through aperture and passageway connection mounting. That is, since the wall 7 is normally a hollow wall having an inner panel 20 and an outer panel 21, it is necessary to seal the exposed hollow space between the panels 20, 21 when the walk-through aperture is cut into the rear wall 7. This function can be achieved by the window frame member 22 of inverted J-shaped cross section to which the mounting frame 17 can be welded and which itself can be rivetted to the inner panel 20 of the wall 7. Thus, after cutting of the appropriate size opening in the rear wall 7, finishing of the necessary cab modifications can be simply, easily and rapidly completed by mounting of the frame member 22 carrying the mounting frame 17.

From the foregoing, it should be apparent how the present invention achieves all of the objects noted above. Furthermore, it should be appreciated that while the preferred embodiment has been disclosed for use with regard to "cab-over" type truck-tractor rigs because of the particular benefits associated with the use of the boot and seal construction relationships in solving problems associated with such an environment, it should also be apparent to those skilled in the art that such a passageway connection is also utilizable and beneficial for use in conjunction with forming other passageways between a vehicle driver's cab and a sleeper or camper unit mounted therebehind such as that of U.S. Pat. No. 3,900,204, noted above, for example.

Therefore, while I have shown and described a single embodiment in accordance with the present invention, it should be understood that the same is not limited thereto, but is susceptible of numerous changes and modifications as known to those skilled in the art, and I therefore do not wish to be limited to the details shown and described herein, but rather, intend to cover all such changes and modifications as are encompassed by the scope of the appended claims.

I claim:

1. An arrangement including a passageway connection for interconnecting the interior of a vehicle driver's cab, of a cab-over engine tractor having a driver's cab carried by a frame and upwardly swingable for providing engine access, and the interior of a sleeper unit mounted to said frame separately from and behind said cab, comprising:
   (a) an outer accordian seal mountable perimetically continuously surrounding an external side of an opening in a wall of said sleeper unit and a facing opening in an exterior wall of said cab at respective opposite ends thereof, said accordian seal being fastened at one end to said sleeper unit and at the other end to said cab, the mounting of at least one of said ends of the accordian seal being by an easily demountable fastening means; and
   (b) an inner boot member mountable about an inner side of said openings at respective opposite ends thereof, in a manner estending from the inner side of the opening in the wall of the sleeper unit, through said outer accordian seal and through the opening in the facing wall of the cab, to the inner side thereof, said inner boot being fastened at one end to said sleeper unit and at the other end to said cab, the mounting of at least one of the ends of the boot member being by an easily demountable fastening means.

2. An arrangement according to claim 1, wherein the demountable fastening means for the accordian seal comprises an annular frame surrounding the opening in the exterior wall of the cab and having a flange extending inwardly, a free-end of said flange lying approximately on an imaginary longitudinal extension of the cab wall opening, and wherein said accordian seal is provided with a clip means slideably engageable onto said flange, so as to create a waterproof seal with, in use, said clip means being held onto said flange by said inner boot member.

3. An arrangement according to claim 1, wherein one end of each of said accordian seal and said boot member are permanently attached to said sleeper unit.

4. An arrangement according to claim 3, wherein said demountable fastening means for the boot member comprises a plurality of snaps.

5. An arrangement according to claim 1 or 2 or 3 or 4 wherein said boot member is formed of a foam padding sandwiched between flexible skin layers.

6. An arrangement according to claim 2, or 4, wherein the accordian seal and the boot member are both fixedly secured to said sleeper unit.

7. An arrangement according to claim 1, or 2, or 4 wherein said boot is formed of a foam padding sandwiched between flexible skin layers, and wherein said accordian seal and said boot member are both fixedly secured to said sleeper unit and are both fastened to said cab by said respective easily demountable fastening means.

* * * * *